(12) United States Patent
Tsuchida et al.

(10) Patent No.: US 11,405,997 B2
(45) Date of Patent: Aug. 2, 2022

(54) LIGHTING CONTROL DEVICE, LIGHTING CONTROL METHOD, AND PROGRAM

(71) Applicant: NIPPON TELEGRAPH AND TELEPHONE CORPORATION, Tokyo (JP)

(72) Inventors: Masaru Tsuchida, Tokyo (JP); Kaoru Hiramatsu, Tokyo (JP); Kunio Kashino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 7 days.

(21) Appl. No.: 17/057,456

(22) PCT Filed: May 23, 2019

(86) PCT No.: PCT/JP2019/020542
§ 371 (c)(1),
(2) Date: Nov. 20, 2020

(87) PCT Pub. No.: WO2019/225714
PCT Pub. Date: Nov. 28, 2019

(65) Prior Publication Data
US 2021/0168914 A1  Jun. 3, 2021

(30) Foreign Application Priority Data

May 24, 2018  (JP) .............................. JP2018-099694

(51) Int. Cl.
*H05B 47/10* (2020.01)
*H05B 45/20* (2020.01)
*H05B 47/165* (2020.01)

(52) U.S. Cl.
CPC ............. *H05B 47/10* (2020.01); *H05B 45/20* (2020.01); *H05B 47/165* (2020.01)

(58) Field of Classification Search
CPC ...... H05B 47/10; H05B 45/20; H05B 47/165; H05B 47/11; H05B 47/135; Y02B 20/40
See application file for complete search history.

(56) References Cited

U.S. PATENT DOCUMENTS

2012/0280624 A1  11/2012  Baaijens et al.
2013/0307419 A1*  11/2013  Simonian ............... H05B 45/20
                                                                 315/153

FOREIGN PATENT DOCUMENTS

JP          2013518384 A       5/2013

OTHER PUBLICATIONS

Shigeki Nakauchi (2015) "A Study on Functional LED Lighting Based on Spectral," Tateishi Science and Technology Foundation Grant Research Results (No. 24) pp. 30-33.

* cited by examiner

Primary Examiner — Daniel D Chang

(57) ABSTRACT

The chroma of a specific color can be emphasized with respect to an object without affecting the color of illumination light. An illumination light generator generates illumination light to be radiated to the object by adding or subtracting, to or from a reference illumination light spectrum that is an illumination spectrum serving as a reference, an element spectrum in accordance with designated conditions with respect to chroma adjustment from among a plurality of element spectra that are spectra for being added or subtracted to or from the reference illumination light spectrum and for performing chroma emphasis of a specific color without affecting an illumination light color.

20 Claims, 10 Drawing Sheets

CHANGE CHROMA OF RED

CHANGE CHROMA OF GREEN

CHANGE CHROMA OF BLUE

LIGHTING CONTROL DEVICE, LIGHTING CONTROL METHOD, AND PROGRAM

CROSS-REFERENCE TO RELATED APPLICATIONS

This application is a U.S. 371 Application of International Patent Application No. PCT/JP2019/020542, filed on 23 May 2019, which application claims priority to and the benefit of JP Application No. 2018-099694, filed on 24 May 2018, the disclosures of which are hereby incorporated herein by reference in their entireties.

TECHNICAL FIELD

The present invention relates to an illumination control apparatus, an illumination control method, and a program, and particularly, to an illumination control apparatus, an illumination control method, and a program for emphasizing the chroma of an object.

BACKGROUND ART

Conventionally, a technology of designing a spectrum of illumination light most suitable for an object and implementing generation and control of the illumination light using multi-color LED light for the purpose of emphasis of the chroma of an entire image, emphasis of the chroma of mixed foreign substances, improvement of discrimination of blood vessels under the skin and a pearl interference color, and the like is known (NPL 1).

CITATION LIST

Non Patent Literature

[NPL 1] Shigeki Nakauchi, "*Bunkou Spekutoru Syushoku ni Motozuku Kinousei LED Syoumei ni Kansuru Kenkyu*" (Research on functional LEDs illuminant based on spectral modification), Tateisi Science and Technology Foundation, composition research results (Vol. 24), 2015, pp. 30-33

SUMMARY OF THE INVENTION

Technical Problem

However, in the technology of Non-Patent Literature 1, even when the chroma of only an arbitrary specific color is attempted to be emphasized, other colors are also affected by chroma emphasis of the specific color. For example, even when illumination light for performing chroma emphasis for red is radiated to an object, a white part of the object is tinged with red. Accordingly, there were problems that it was impossible to perform chroma emphasis of only an arbitrary specific color and adjustment of a degree of chroma emphasis.

In addition, there was a problem that it was extremely difficult to perform interactive operation because a large amount of calculations needed to be performed in advance to carry out chroma emphasis. Furthermore, a large amount of calculation is necessary for fine adjustment of color appearance.

Moreover, there was a problem that, when the chroma of a certain color was continuously changed, continuous change of a calculated illumination light spectrum was not guaranteed and appearance of the color also became discontinuous due to discontinuous change of the illumination light spectrum.

An object of the present invention devised in view of the aforementioned circumstances is to provide an illumination control apparatus, an illumination control method, and a program which can emphasize the chroma of a specific color with respect to an object without affecting the color of illumination light.

Means for Solving the Problem

An illumination control apparatus according to the present invention is an illumination control apparatus for generating illumination light to be radiated to an object, including an illumination light generator which generates illumination light to be radiated to the object by adding or subtracting, to or from a reference illumination light spectrum that is an illumination spectrum serving as a reference, an element spectrum in accordance with designated conditions with respect to chroma adjustment from among a plurality of element spectra that are spectra for being added or subtracted to or from the reference illumination light spectrum and for performing chroma emphasis of a specific color without affecting an illumination light color.

An illumination control method according to the present invention is an illumination control method for generating illumination light to be radiated to an object, including, by an illumination light generator, generating illumination light to be radiated to the object by adding or subtracting, to or from a reference illumination light spectrum that is an illumination spectrum serving as a reference, an element spectrum in accordance with designated conditions with respect to chroma adjustment from among a plurality of element spectra that are spectra for being added or subtracted to or from the reference illumination light spectrum and for performing chroma emphasis of a specific color without affecting an illumination light color.

According to the illumination control apparatus and the illumination control method according to the present invention, the illumination light generator generates illumination light to be radiated to an object by adding or subtracting, to or from a reference illumination light spectrum that is an illumination spectrum serving as a reference, an element spectrum in accordance with designated conditions with respect to chroma adjustment from among a plurality of element spectra that are spectra for being added or subtracted to or from the reference illumination light spectrum and for performing chroma emphasis of a specific color without affecting an illumination light color.

In this manner, the illumination light to be radiated to the object is generated by adding or subtracting, to or from a reference illumination light spectrum that is an illumination spectrum serving as a reference, an element spectrum in accordance with designated conditions with respect to chroma adjustment from among a plurality of element spectra that are spectra for being added or subtracted to or from the reference illumination light spectrum and for performing chroma emphasis of a specific color without affecting an illumination light color, and thus it is possible to emphasize the chroma of a specific color with respect to the object without affecting the color of the illumination light.

Further, the illumination control apparatus according to the present invention may further include: a spectral reflection factor acquisition unit which acquires a plurality of spectral reflection factors in the object or a color chip serving as a reference; a reference illumination light spectrum acquisition unit which acquires the reference illumination light spectrum; a designated condition acquisition unit which acquires a plurality of designated conditions; and an element spectrum calculator which calculates the element spectrum that satisfies the designated conditions on the basis of the reference illumination light spectrum and the spectral reflection factors corresponding to the designated conditions with respect to the plurality of designated conditions.

Further, the element spectrum calculator of the illumination control apparatus according to the present invention may further include: an illumination light spectrum calculator which calculates calculated illumination light spectra that are illumination light spectra and satisfy the designated conditions on the basis of the reference illumination light spectrum and the spectral reflection factors corresponding to the designated conditions with respect to the plurality of designated conditions; and an illumination light spectrum analyzer which generates the element spectrum that satisfies the designated conditions on the basis of the calculated illumination light spectrum that satisfies the designated conditions and the reference illumination light spectrum with respect to the plurality of designated conditions.

Further, the illumination control apparatus according to the present invention may further include: a composite illumination light spectrum calculator which calculates a composite illumination light spectrum that is an illumination light spectrum that satisfies input designated conditions on the basis of the plurality of element spectra generated by the element spectrum calculator, the input reference illumination light spectrum, and the input designated conditions; and a feedback processor which transmits an error between the composite illumination light spectrum and a measurement result of a spectrum of the illumination light radiated to the object to the illumination light generator when the error is equal to or greater than a predetermined reference value, wherein the illumination light generator may correct generated illumination light on the basis of the error.

Further, the feedback processor of the illumination control apparatus according to the present invention may update the reference illumination light spectrum to the measurement result of the spectrum of the illumination light radiated to the object when the error is less than the predetermined reference value.

The illumination control apparatus according to the present invention may further include a weighting processor which selects at least one element spectrum for satisfying input designated conditions from the plurality of element spectra and determines a weight for each of the at least one selected element spectrum, wherein the illumination light generator may generate illumination light to be radiated to the object by weighting each of the at least one selected element spectrum and adding or subtracting the weighted element spectrum to or from the reference illumination light spectrum.

A program according to the present invention is a program causing a computer to serve as each component of the illumination control apparatus.

Effects of the Invention

According to the illumination control apparatus, illumination control method, and program of the present invention, it is possible to emphasize the chroma of a specific color with respect to an object without affecting the color of illumination light.

DESCRIPTION OF EMBODIMENTS

Figure 1:
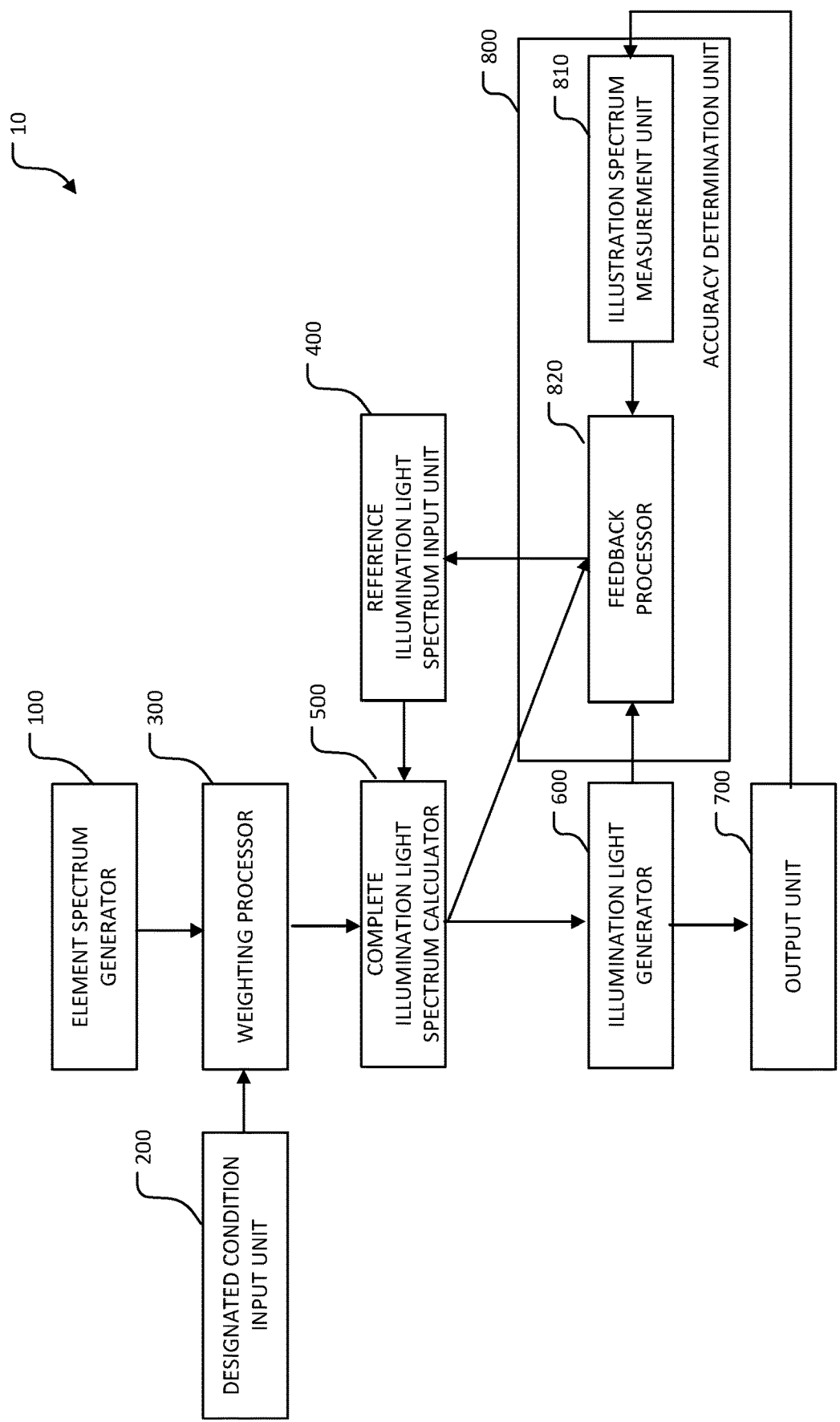
FIG. 1 is a block diagram showing a configuration of an illumination control apparatus according to an embodiment of the present invention.

Hereinafter, an embodiment of the present invention will be described with reference to the drawings.

<Principle of Illumination Control Apparatus According to Embodiment of the Present Invention>

First, the principle of an illumination control apparatus according to an embodiment of the present invention will be described.

In the present embodiment, an element spectrum $$e_i$$

for performing chroma emphasis of only a specific color i is calculated and illumination control is performed in an illumination control apparatus which performs illumination control for emphasizing colors of a drawing and the like.

Metamerism in which "an appearing color does not change even when an illumination light spectrum is changed" can be formulated as the following formula (1).

[Formula 1]

$$CR_j w = CR_j x_i, \quad (1)$$
$$C = [X, Y, Z]^T,$$
$$R_j = \begin{pmatrix} r_{j,360} & \cdots & 0 \\ \vdots & \ddots & \vdots \\ 0 & \cdots & r_{j,780} \end{pmatrix},$$
$$w = [w_{360}, \ldots w_{780}]^T,$$
$$x_i = [x_{i,360}, \ldots x_{i,780}]^T$$

Here, "360" and "780" in the above formula represent wavelengths in the wavelength region of visible light, $$w = [w_{360}, \ldots w_{780}]^T$$

and $$x_i = [x_{i,360}, \ldots x_{i,780}]^T$$

represent components in 360 nm to 780 nm.

In addition, i is an index indicating a specific color that is a target of which chroma is intended to be changed (e.g., red, green, blue, or the like) and j is an index indicating a color for which metamerism is established (e.g., white that is an illumination light color, or the like; a situation in which the appearance of white does not change is called metameric white).

Furthermore, $$X, Y, Z$$

is a color-matching function (a function having wavelengths as parameters; colors having the same tristimulus values obtained by the color-matching function are seen by the human eye as the same color), $$[r_{j,360}, \ldots r_{j,780}]^T$$

represents a plurality of spectral reflection factors $r_j$ with respect to a color represented by the index j, $$w$$

is a reference illumination light spectrum (spectral radiance distribution, spectrum) that is an illumination light spectrum serving as a reference of illumination light, and $$x_i$$

is an illumination light spectrum for changing the chroma of only a specific color represented by the index i (hereinafter, calculated illumination light spectrum).

Here, the chroma of only a specific color represented by the index i can be emphasized by discovering a calculated illumination light spectrum $$x_i$$

that maximizes the value of $$|L(CR_j w) - L(CR_j x_i)|$$

through a simulation or the like. Here, "emphasis" includes decreasing the chroma of only a specific color as well as increasing the same.

In addition, $$L(.)$$

is an operator for calculating a CIE-La*b* value. Further, a method of obtaining the calculated illumination light spectrum $$x_i$$

is not limited to the aforementioned method.

Here, the element spectrum $$e_i$$

of a specific color represented by the index i is defined as represented by the following formula (2).

[Formula 2]

$$e_i = w - x_i \quad (2)$$

Here, elements of the element spectrum $$e_i$$

may include an element having a negative value.

When the element spectrum $$e_i$$

is used, the following formula (3) is defined.

[Formula 3]

$$\hat{x}_i = w + k_i e_i \quad (3)$$

Here, $k_i$ is a variable for controlling a chroma. $k_i$ may be a negative value within a range in which the value of the illumination light spectrum is not negative. That is, when $k_i$ is a negative value, the chroma of only a specific color represented by the index i can be decreased.

Meanwhile, it is possible to confirm from the following formula (4) that the illumination light spectrum $$\bar{x}_i$$

satisfies metamerism with respect to a color represented by the index j.

[Formula 4]

$$C x_i = C(w + k_i e_i) \quad (4)$$
$$= C w + k_i C(w - x_i)$$
$$= (1 + k_i) C w - k_i C x_i$$

That is, it is ascertained that the illumination light spectrum $$\bar{x}_i$$

satisfies metamerism with respect to a color represented by the index j in the formula (4) from the fact that the metamerism with respect to the color represented by the index j is defined by the formula (1).

It is possible to emphasize the chromas of various colors with respect to an object without affecting a color represented by the index j by using the aforementioned element spectrum $$e_i.$$

That is, it is possible to adjust a color to be emphasized and a degree of emphasis by simply adding/subtracting the element spectrum $$e_i$$

to/from the reference illumination light spectrum $$w.$$

As a degree of emphasis, any coefficient may be applied to the element spectrum.

A target color for which the chroma will be adjusted and a color that is an object of metamerism are not limited to white, blue, green, red, and the like and may be "bluish green," "yellow," "flesh tone," "orange," and the like. When a picture or the like is an object or a subject is in front of a wall or the like, background colors that significantly affect appearance (e.g., the color of a part occupying a large area of the picture, the color of paper or a canvas, the color of the wall, and the like) may be an object of metamerism.

<Configuration of Illumination Control Apparatus According to Embodiment of the Present Invention>

A configuration of the illumination control apparatus 10 according to an embodiment of the present invention will be described with reference to FIG. 1. FIG. 1 is a block diagram showing a configuration of the illumination control apparatus 10 according to an embodiment of the present invention.

The illumination control apparatus 10 is configured as a computer including a CPU, a RAM, and a ROM storing a program for executing an element spectrum generation processing routine and an illumination control processing routine which will be described later and functionally configured as follows.

As shown in FIG. 1, the illumination control apparatus 10 according to the present embodiment is an illumination control apparatus for generating illumination light to be radiated to an object, including an element spectrum generator 100, a designated condition input unit 200, a reference illumination light spectrum input unit 400, a weighting processor 300, a composite illumination light spectrum calculator 500, an illumination light generator 600, an output unit 700, and a feedback processor 800.

The element spectrum generator 100 generates element spectra that are spectra for performing chroma emphasis of a specific color without affecting an illumination light color in order to perform addition or subtraction for a reference illumination light spectrum that is an illumination spectrum serving as a reference.

Figure 2:
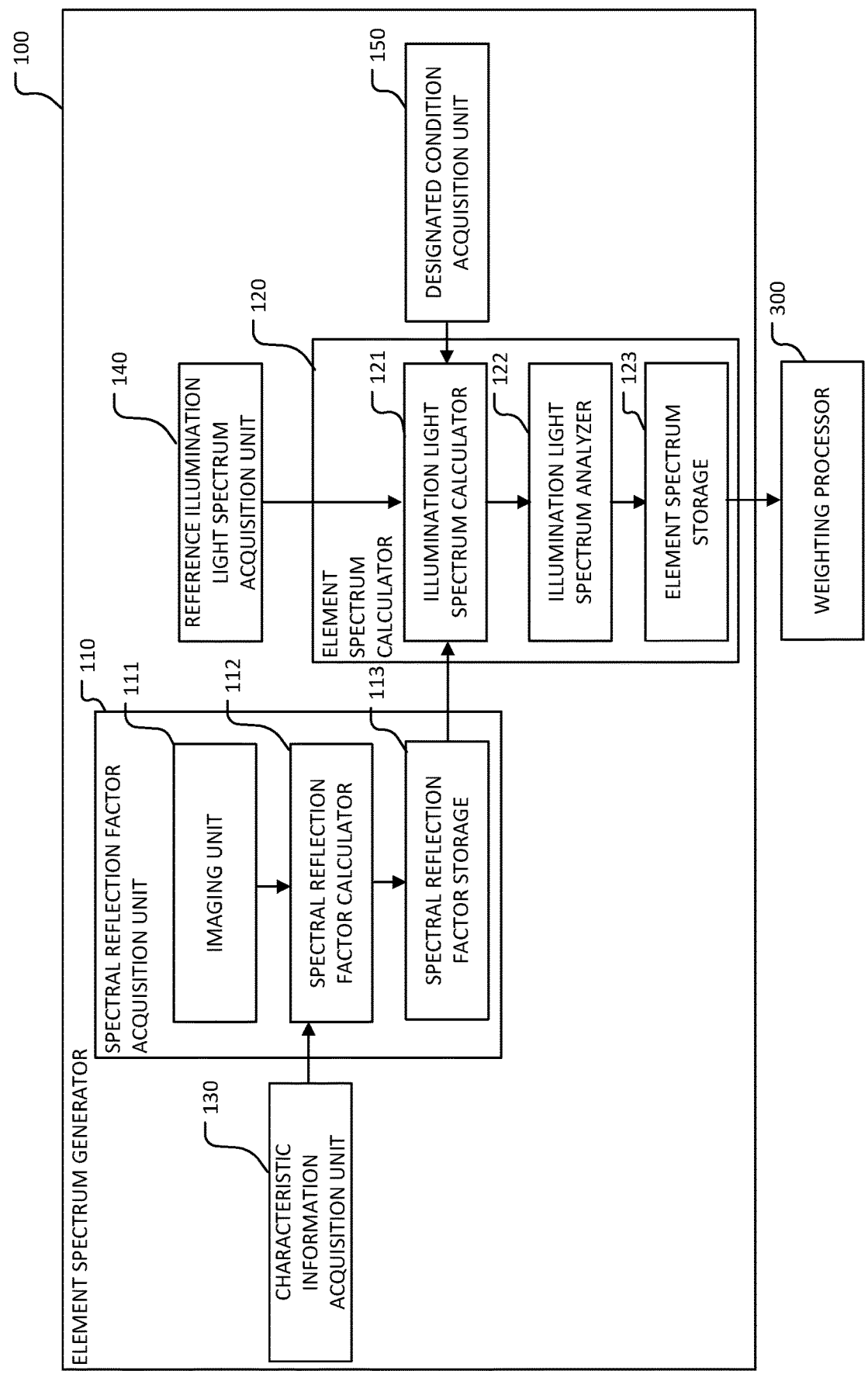
FIG. 2 is a block diagram showing a configuration of an element spectrum generator of the illumination control apparatus according to an embodiment of the present invention.

Specifically, the element spectrum generator 100 includes a spectral reflection factor acquisition unit 110, an element spectrum calculator 120, a characteristic information acquisition unit 130, a reference illumination light spectrum acquisition unit 140, and a designated condition acquisition unit 150 as shown in FIG. 2.

The characteristic information acquisition unit 130 acquires statistical information about a target region, a sensitivity characteristic of an imaging device such as a camera, an illumination light spectrum during imaging, and a spectral reflection factor of an object.

Specifically, the characteristic information acquisition unit 130 stores statistical information about a target region for each color, a sensitivity characteristic of an imaging device, an illumination light spectrum during imaging, and a spectral reflection factor of an object or a color chip (hereinafter collectively referred to as characteristic information) in advance or receives the characteristic information input by a person.

Then, the characteristic information acquisition unit 130 transmits the characteristic information to a spectral reflection factor calculator 112.

The reference illumination light spectrum acquisition unit 140 acquires the reference illumination light spectrum that is an illumination spectrum serving as a reference using the illumination control apparatus 10. The reference illumination light spectrum is a spectrum of illumination light of an environment in which an object is observed, which has been obtained in advance and is, for example, solar light, fluorescent light, incandescent light, LED light, or a combination thereof.

Then, the reference illumination light spectrum acquisition unit 140 transmits the reference illumination light spectrum to an illumination light spectrum calculator 121.

The designated condition acquisition unit 150 acquires a plurality of designated conditions with respect to chroma adjustment.

Specifically, the designated condition acquisition unit 150 acquires M assumed designated conditions with respect to designated conditions on chroma adjustment such as "how to change the appearance of the color of an object". For example, "the chroma of blue is maximized without changing the appearance and brightness of white in a color chart" may be set as a designated condition.

The M designated conditions may be prepared by a person or set as all designated conditions that can be received by the illumination control apparatus 10.

In addition, the designated condition acquisition unit 150 transmits the acquired M designated conditions to the illumination light spectrum calculator 121.

The spectral reflection factor acquisition unit 110 acquires a plurality of spectral reflection factors in a color chip that is an object or a reference.

Specifically, the spectral reflection factor acquisition unit 110 includes an imaging unit 111, the spectral reflection factor calculator 112, and a spectral reflection factor storage 113.

The imaging unit 111 images an image of an object that is a subject of an observation target, or a color chip such as a color chart used as a reference with a predetermined number (X) of color channels (bands) using an imaging device (not shown). Here, since the number of color channels of an RGB camera that is a general imaging device is three, the predetermined number is three or more ($X \geq 3$).

In addition, the imaging unit 111 may acquire spectral radiance (spectrum) through spot measurement (measurement at spots) for the object or the color chip using a spectral radiance meter (spectrometer or the like) instead of the imaging device.

Then, the imaging unit 111 transmits image data or spectra of the X color channels to the spectral reflection factor calculator 112.

The spectral reflection factor calculator 112 calculates a plurality of spectral reflection factors on the basis of the image data of the X color channels acquired by the imaging unit 111 and the statistical information about the target region for each color, the sensitivity characteristic of the imaging device, an illumination light spectrum during imaging, and a spectral reflection factor of the object or the color chip, which were obtained by the characteristic information acquisition unit 130.

As a calculation method, for example, a method of calculating spectral reflection factors of L colors by obtaining a Wiener estimation matrix from the statistical information about the sensitivity characteristic of the imaging device, the illumination light spectrum during imaging, and the spectral reflection factor of the object or the color chip for each color and multiplying the Wiener estimation matrix by pixel values of the X color channels in a target region of the corresponding color (Wiener estimation method) may be used.

Meanwhile, a spectral reflection factor calculation method is not limited to the Wiener estimation method and other existing techniques may be used.

Then, the spectral reflection factor calculator 112 transmits the calculated spectral reflection factors of the L colors to the spectral reflection factor storage 113 as L spectral reflection factors.

The spectral reflection factor storage 113 stores the L spectral reflection factors calculated by the spectral reflection factor calculator 112.

The spectral reflection factor storage 113 may record the L spectral reflection factors in external storage media.

In addition, the spectral reflection factor storage 113 may store L spectral reflection factors in an existing spectral reflection factor database. Further, the spectral reflection factor storage 113 may be configured to store L spectral reflection factors prepared in advance.

The element spectrum calculator 120 calculates element spectra that satisfy the plurality of designated conditions on the basis of the reference illumination light spectrum and spectral reflection factors corresponding to the designated conditions with respect to the plurality of designated conditions.

Specifically, the element spectrum calculator 120 includes the illumination light spectrum calculator 121, an illumination light spectrum analyzer 122, and an element spectrum storage 123.

The illumination light spectrum calculator 121 calculates calculated illumination light spectra that are illumination light spectra satisfying the plurality of designated conditions on the basis of the reference illumination light spectrum and the spectral reflection factors corresponding to the designated conditions with respect to the plurality of designated conditions.

Specifically, first, the illumination light spectrum calculator 121 acquires the L spectral reflection factors stored in the spectral reflection factor storage 113, the reference illumination light spectrum acquired by the reference illumination light spectrum acquisition unit 140, and the M designated conditions acquired by the designated condition acquisition unit 150.

Next, with respect to the M designated conditions, the illumination light spectrum calculator 121 calculates calculated illumination light spectra that are illumination light spectra satisfying the M designated conditions on the basis of the reference illumination light spectrum and spectral reflection factors corresponding to the designated conditions from among the L spectral reflection factors.

For example, when a designated condition is "only red is emphasized and illumination light colors are not changed" and the illumination light colors are white, blue and green, the index i is {red} and the index j is {white, blue, green}. Accordingly, a calculated illumination light spectrum $x_{red}$ with respect to red can be represented by the following formula (5).

[Formula 5]

$$x_{red} = \tilde{x},\qquad(5)$$

for $|L(CR_{red}w) - L(CR_{red}\tilde{x})| \to MAX$,
under the conditions
$CR_{white}w = CR_{white}\tilde{x}$,
$CR_{blue}w = CR_{blue}\tilde{x}$,
$CR_{green}w = CR_{green}\tilde{x}$.

The calculated illumination light spectrum $x_{red}$ can be obtained by performing a simulation such that it becomes an illumination light spectrum that emphasizes only red according to the above formula (5). For example, a generalized reduced gradient method (GRG) may be used, the present invention is not limited thereto and other methods may be used. In addition, conditional expressions with respect to white, blue and green represented in the formula (5) may be established in cases in which differences between the right terms and the left terms are equal to or less than a certain threshold value as well as cases in which the right terms are exactly the same as the left terms.

In addition, when an illumination light spectrum can be represented by a linear sum of N functions ($n_k$) (for example, when a light source device that is composed of LEDs of multiple colors and can control brightness of each LED is used), $\tilde{x}$ can be represented by the following formula (6).

[Formula 6]

$$\tilde{x} = \Sum_{k=1}^{N} \alpha_k n_k,\qquad(6)$$

Accordingly, unknown variables when the calculated illumination light spectrum $x_{red}$ is obtained are a number N of $\alpha_k$ and thus the amount of calculations can be reduced.

In addition, the illumination light spectrum calculator 121 transmits M data sets composed of the designated conditions and obtained calculated illumination light spectra, and the reference illumination light spectrum to the illumination light spectrum analyzer 122.

The illumination light spectrum analyzer 122 generates element spectra that satisfy the plurality of designated conditions on the basis of the calculated illumination light spectra that satisfy the designated conditions and the reference illumination light spectrum with respect to the plurality of designated conditions.

Specifically, the illumination light spectrum analyzer 122 analyzes the calculated illumination light spectra and calculates P element spectra such as element spectra that "emphasize only blue", element spectra that "emphasize only green" and element spectra that "emphasize only red."

For example, in the case of the calculated illumination light spectrum $x_{red}$ obtained using the aforementioned formula (5), an element spectrum $e_{red}$ that "emphasizes only red" is calculated using the following formula (7).

[Formula 7]

$$e_{red} = w - x_{red}\qquad(7)$$

Meanwhile, the value of each wavelength of an element spectrum may be a negative value.

Further, as a method of calculating an element spectrum, methods such as (1) a method of calculating the average of differences between calculated illumination spectra when the chroma of red is changed at specific intervals (e.g., increased 10%, increased 20%) as an element spectrum, (2) a method of calculating an element spectrum which emphasizes red on the basis of a condition that the element spectrum which emphasizes red is perpendicular to an illumination light spectrum (spectrum of white) and spectra of blue and green of the color chart (the same with respect to green and blue), and the like can be employed, but the present invention is not limited thereto.

In addition, the illumination light spectrum analyzer 122 transmits the P calculated element spectra to the element spectrum storage 123.

The element spectrum storage 123 stores the plurality of element spectra acquired by the illumination light spectrum analyzer 122.

Specifically, the element spectrum storage 123 stores the P element spectra. The element spectra may be stored in an external storage medium.

Then, the element spectrum storage 123 transmits the stored P element spectra to the weighting processor 300.

The designated condition input unit 200 receives input of designated conditions and transmits the received designated conditions to the weighting processor 300.

The weighting processor 300 selects at least one element spectrum for satisfying the input designated conditions from the plurality of element spectra and determines a weight for each of the at least one selected element spectrum.

Specifically, the weighting processor 300 selects at least one element spectrum for realizing the input designated conditions from the P element spectra. For example, selection may be performed using a method of selecting only an element spectrum corresponding to a specific color when only the specific color is desired to be emphasized, a method of selecting a plurality of element spectra corresponding to colors constituting a color that is composed of two or more colors when the color is desired to be emphasized, and the like. Meanwhile, an element spectrum for realizing each designated condition may be determined in advance for each designated condition.

In addition, the weighting processor 300 determines a weight for each of the at least one selected element spectrum according to the designated conditions. For example, when red and blue are desired to be emphasized, determination is performed using a method of increasing a weight of an element spectrum for red and a weight of an element spectrum for blue when red is desired to be more emphasized and determining a weight of an element spectrum in accordance with a degree of emphasis of red when only red is desired to be emphasized, and the like. Meanwhile, a weight of an element spectrum for realizing each designated condition may be determined in advance for each designated condition.

Further, the weighting processor 300 transmits the at least one selected element spectrum and the weight for each of the at least one selected element spectrum to the composite illumination light spectrum calculator 500.

The reference illumination light spectrum input unit 400 receives input of the reference illumination light spectrum serving as a reference for the illumination control apparatus 10 or stores the reference illumination light spectrum in advance.

Then, the reference illumination light spectrum input unit 400 transmits the reference illumination light spectrum to the composite illumination light spectrum calculator 500.

The composite illumination light spectrum calculator 500 calculates a composite illumination light spectrum that is an illumination light spectrum satisfying the input designated conditions on the basis of the plurality of element spectra generated by the element spectrum calculator 120, the input reference illumination light spectrum, and the input designated conditions.

Specifically, the composite illumination light spectrum calculator 500 calculates the composite illumination light spectrum obtained by weighting-adding a plurality of selected element spectra to the reference illumination light spectrum.

Then, the composite illumination light spectrum calculator 500 transmits the calculated composite illumination spectrum to the illumination light generator 600.

The illumination light generator 600 generates illumination light on the basis of the composite illumination light spectrum calculated by weighting each of the at least one selected element spectrum and adding or subtracting the at least one weighted element spectrum to or from the reference illumination light spectrum and radiates the illumination light to the object through the output unit 700.

Specifically, the illumination light generator 600 generates illumination light having the composite illumination light spectrum. For example, when the output unit 700 is an illumination device composed of LED light sources having multiple colors, emission intensity of the LED light source of each color is determined on the basis of the composite illumination light spectrum. Meanwhile, a function of controlling emission of each LED light source on the basis of input/output characteristic data of each LED light source may be included.

In addition, when an error is received from an accuracy determination unit 820, the illumination light generator 600 corrects the illumination light to be output on the basis of the error and the composite illumination light spectrum and radiates the corrected illumination light through the output unit 700.

The output unit 700 is composed of LED light sources having multiple colors and turns on the LED light source of each color according to emission intensity of the LED light source of each color included in the generated illumination light.

When an error between the composite illumination light spectrum and a measurement result of the spectrum of the illumination light radiated to the object is equal to or greater than a predetermined reference value, the feedback processor 800 transmits the error to the illumination light generator 600.

Specifically, the feedback processor 800 includes an illumination light spectrum measurement unit 810 and the accuracy determination unit 820.

The illumination light spectrum measurement unit 810 measures the spectrum of the illumination light radiated by the output unit 700 using a spectral radiance meter or the like. Meanwhile, the object receiving the illumination light radiated through the output unit 700 may be imaged using a camera having three or more color channels and the spectrum of the illumination light may be estimated and measured from the image.

Then, the illumination light spectrum measurement unit 810 transmits the measured spectrum of the illumination light to the accuracy determination unit 820.

The accuracy determination unit 820 compares the composite illumination light spectrum acquired by the composite illumination light spectrum calculator 500 with the spectrum of the illumination light measured by the illumination light spectrum measurement unit 810 and determines whether an error therebetween is equal to or greater than the predetermined reference value.

When the error is equal to or greater than the reference value, it is determined that the accuracy of the output illumination light is not sufficient and the error is transmitted to the illumination light generator 600.

On the other hand, when the error is less than the predetermined reference value, the reference illumination light spectrum stored in the reference illumination light spectrum input unit 400 is updated to the measurement result of the spectrum of the illumination light radiated to the object.

<Example of Illumination Control Apparatus According to Embodiment of the Present Invention>

Next, an example of the illumination control apparatus 10 according to the present embodiment will be described.

Figure 3:
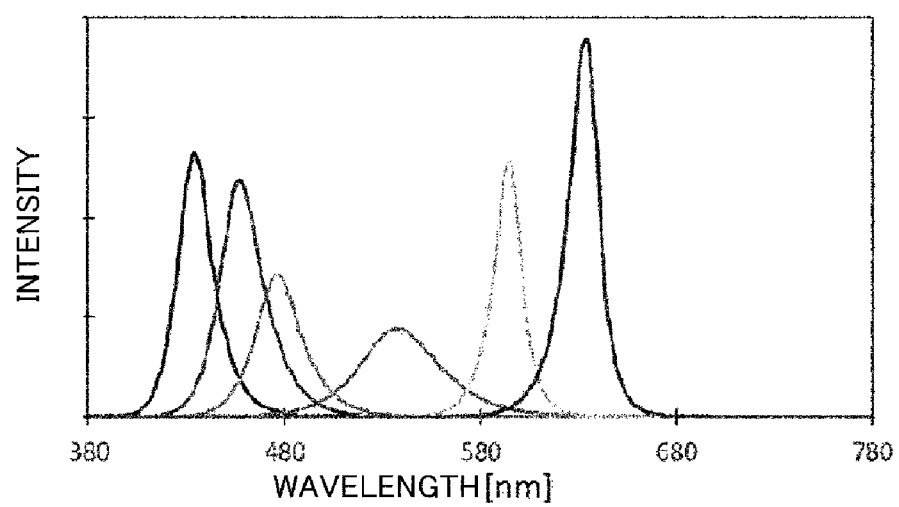
FIG. 3 is a diagram showing an example of LED spectral radiance of each color of an LED device using the illumination control apparatus according to an embodiment of the present invention.

In the present example, it is assumed that the illumination control apparatus 10 uses a light source device composed of 6 types of LEDs shown in FIG. 3 as the output unit 700.

Figure 4:
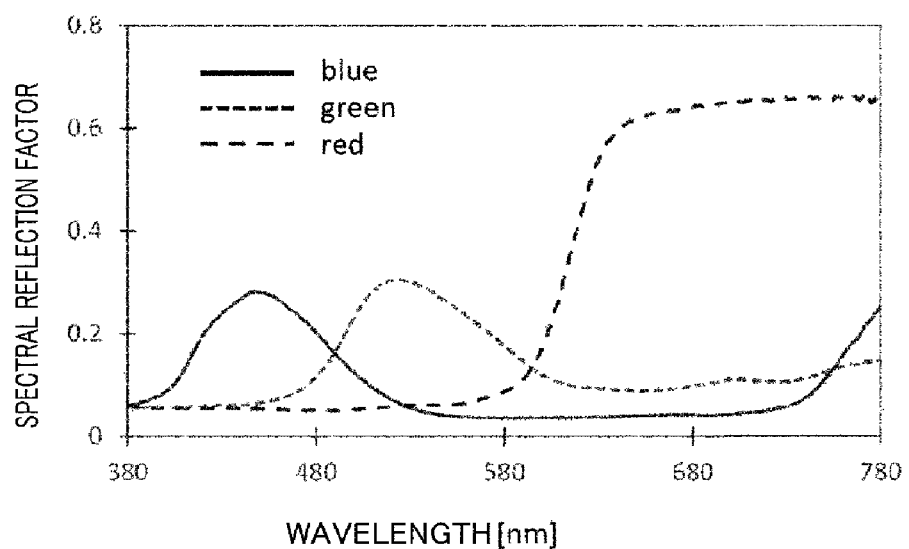
FIG. 4 is a diagram showing an example of a spectral reflection factor according to an embodiment of the present invention.

First, it is assumed that the spectral reflection factor acquisition unit 110 acquires a spectral reflection factor of each color in advance using an existing color chip in the present example. FIG. 4 shows spectral reflection factors with respect to blue, green and red acquired from the color chip.

Figure 5:
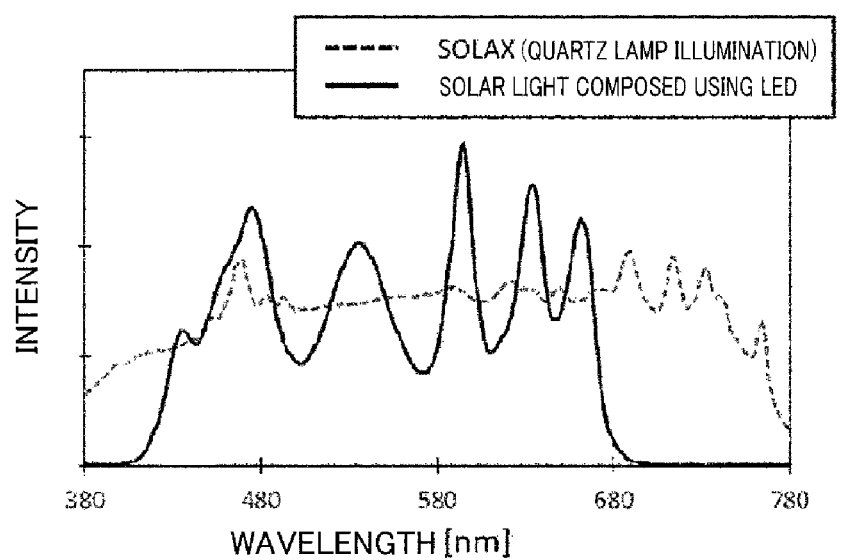
FIG. 5 is a diagram showing an example of a reference illumination light spectrum according to an embodiment of the present invention.

In addition, it is assumed that the reference illumination light spectrum acquisition unit 140 acquires a reference illumination light spectrum composed using the illumination control apparatus 10 as shown in FIG. 5 (solar light composed using LEDs of FIG. 5).

Figure 6:
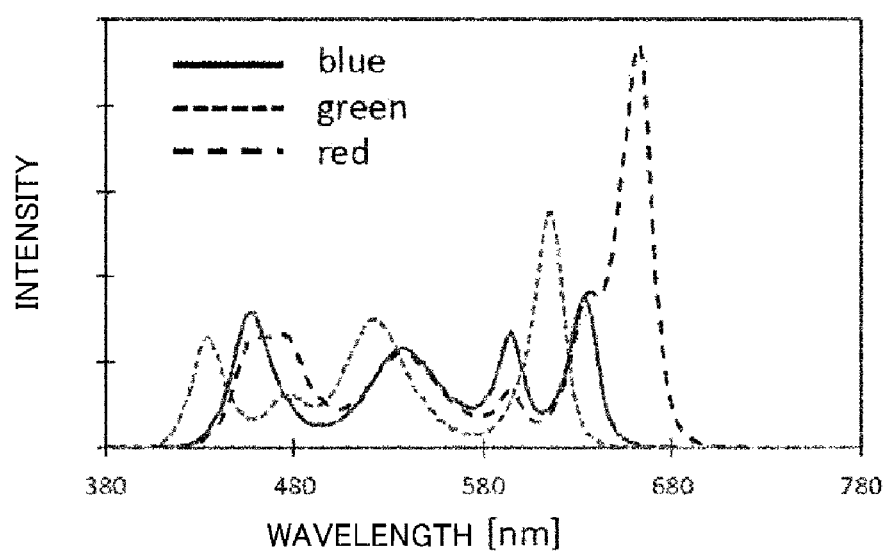
FIG. 6 is a diagram showing an example of calculated illumination light spectra that maximize the chromas of blue, green and red according to an embodiment of the present invention.

The illumination light spectrum calculator 121 obtains calculated illumination light spectra (specifically, the parameter $\alpha_k$ in the formula (6)) using GRG. FIG. 6 shows an example of calculated illumination light spectra that maximize the chromas of blue, green and red.

Figure 7:
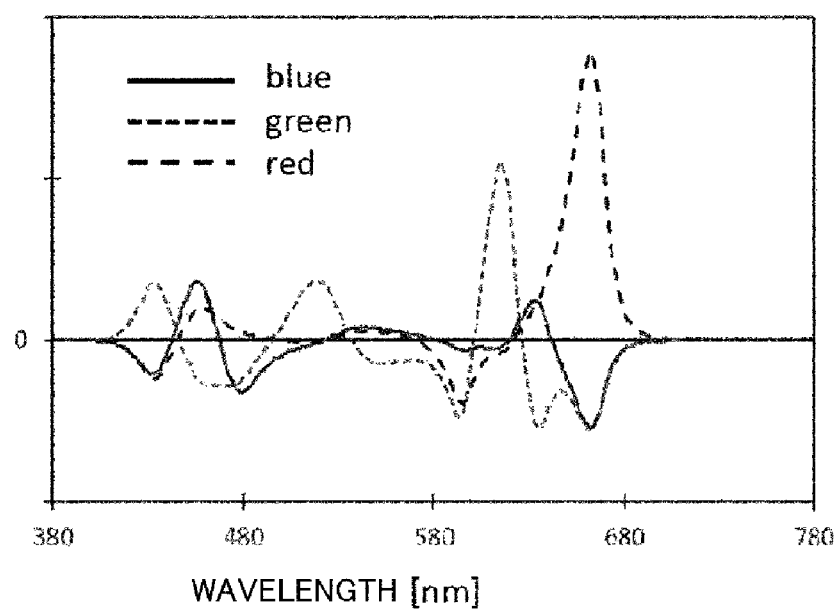
FIG. 7 is a diagram showing an example of element spectra calculated for blue, green and red according to an embodiment of the present invention.

In addition, the element spectrum generator 100 generates element spectra with respect to blue, green and red shown in FIG. 7 on the basis of the acquired calculated illumination light spectra with respect to blue, green and red. FIG. 7 shows element spectra calculated with respect to blue, green and red.

Next, three designated conditions for respectively emphasizing the chromas of blue, green and red are input to the designated condition input unit 200.

Further, the same reference illumination light spectrum as that of the reference illumination light spectrum acquisition unit 140 is input to the reference illumination light spectrum input unit 400.

Figure 8:
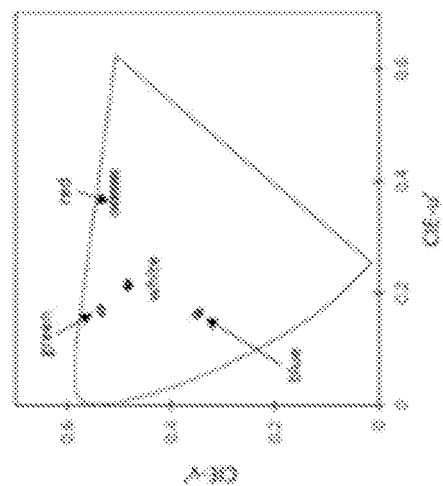
FIG. 8 is a diagram showing an example of color distributions on a CIE-u'v' chromaticity diagram when chroma emphasis processing has been performed on blue, green and red according to an embodiment of the present invention.
Figure 8:
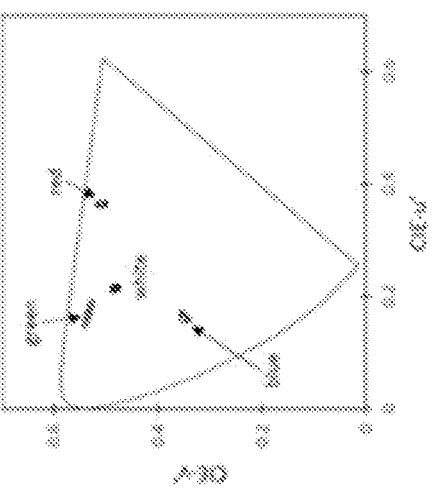
Figure 8:
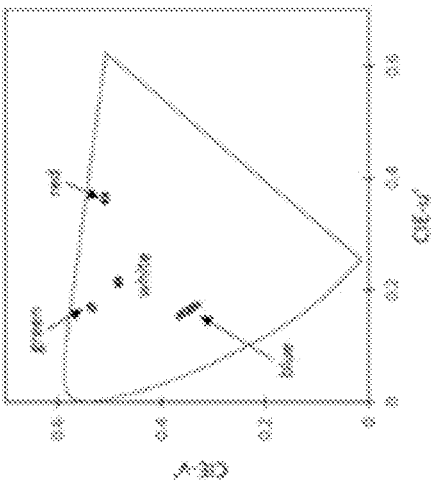

Results obtained by plotting color distributions of a composite illumination light spectrum when the parameter $k_i$ of the formula (3) has been changed using the acquired element spectra on the basis of the aforementioned three designated conditions on a chromaticity diagram CIE-u'v' is shown in FIG. 8.

In all cases, changes in chromas of blue, green and red while the appearance of white is maintained (metameric white) can be confirmed.

That is, the results of FIG. 8 show that hue is also changed such that triangles having three points representing blue, green and red as vertexes are enlarged, and chroma and hue can be emphasized while maintaining white balance and overall color balance using the illumination control apparatus 10 according to the present embodiment.

<Operation of Illumination Control Apparatus According to Embodiment of the Present Invention>

Figure 9:
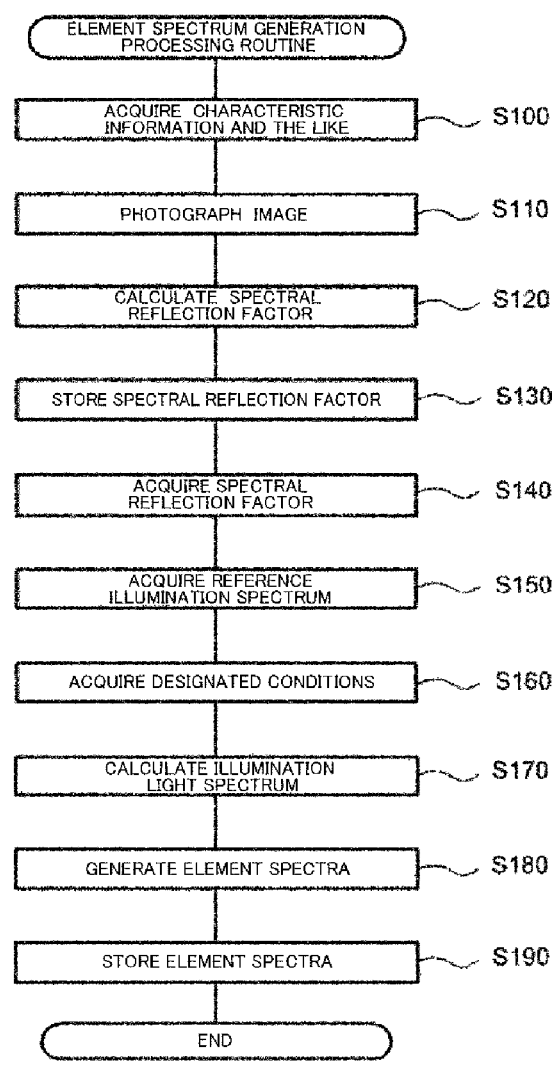
FIG. 9 is a flowchart showing an element spectrum generation processing routine of the illumination control apparatus according to an embodiment of the present invention.

FIG. 9 is a flowchart showing an element spectrum generation processing routine according to an embodiment of the present invention.

When an element spectrum generation processing command is input to the illumination control apparatus 10, the element spectrum generation processing routine shown in FIG. 9 is executed in the element spectrum generator 100.

First, the characteristic information acquisition unit 130 acquires statistical information about a target region, a sensitivity characteristic of an imaging device such as a camera, an illumination light spectrum during imaging, and a spectral reflection factor of an object in step S100.

The imaging unit 111 images an image of the object that is a subject of an observation target or a color chip such as a color chart used as a reference with a predetermined number (X) of color channels (bands) using an imaging device (not shown) in step S110.

The spectral reflection factor calculator 112 calculates a plurality of spectral reflection factors on the basis of image data or spectra of the X color channels acquired in step S110 and the statistical information about the target region, the sensitivity characteristic of the imaging device, the illumination light spectrum during imaging, and the spectral reflection factor of the object acquired in step S100 in step S120.

The spectral reflection factor storage 113 stores L spectral reflection factors calculated in step S120 in step S130.

The illumination light spectrum calculator 121 acquires the L spectral reflection factors stored in the spectral reflection factor storage 113 in step S140.

The illumination light spectrum calculator 121 acquires a reference illumination light spectrum obtained by the reference illumination light spectrum acquisition unit 140 in step S150.

The illumination light spectrum calculator 121 acquires M designated conditions acquired by the designated condition acquisition unit 150 in step S160.

The illumination light spectrum calculator 121 calculates calculated illumination light spectra that are illumination light spectra satisfying a plurality of designated conditions on the basis of the reference illumination light spectrum and spectral reflection factors corresponding to the designated conditions with respect to the plurality of designated conditions in step S170.

The illumination light spectrum analyzer 122 generates element spectra that satisfy the plurality of designated conditions on the basis of the calculated illumination light spectrums satisfying the designated condition and the reference illumination light spectrum with respect to the plurality of designated conditions in step S180.

The element spectrum storage 123 stores the plurality of element spectra acquired in step S180 in step S190.

Figure 10:
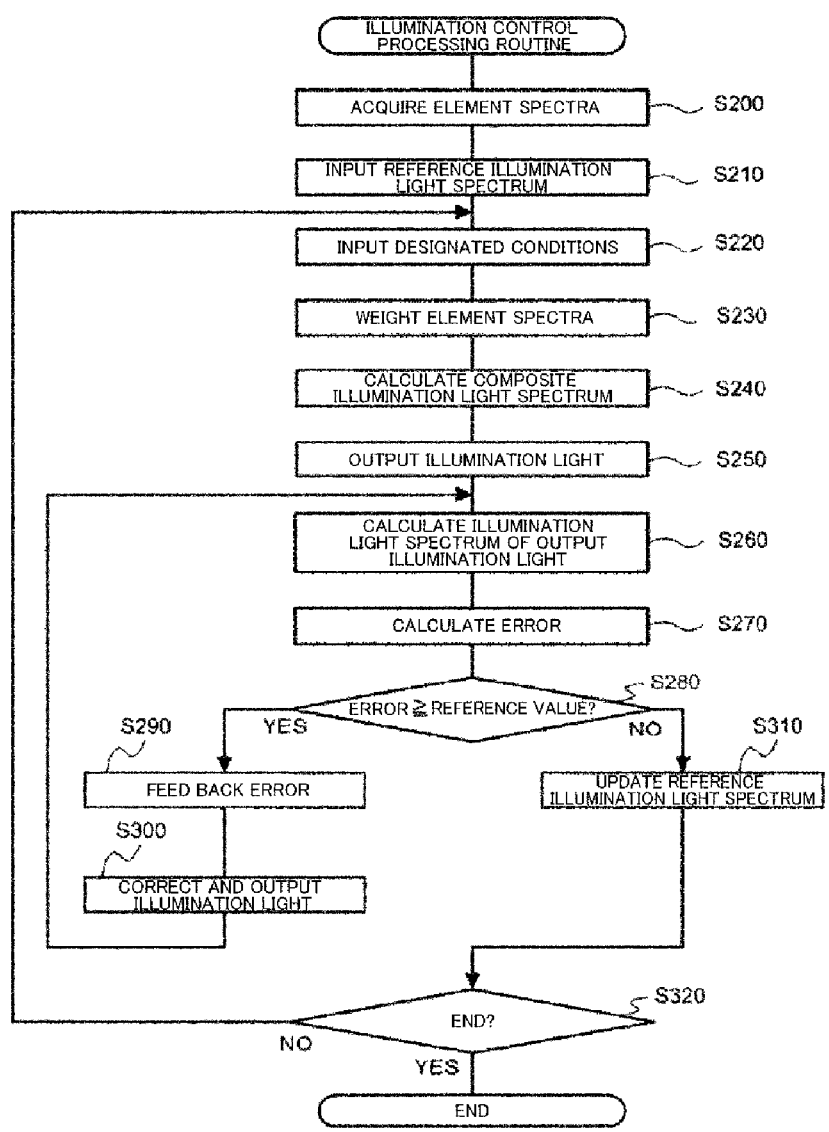
FIG. 10 is a flowchart showing an illumination control processing routine of the illumination control apparatus according to an embodiment of the present invention.

FIG. 10 is a flowchart showing an illumination control processing routine according to an embodiment of the present invention.

When designated conditions are input to the designated condition input unit 200, the illumination control processing routine shown in FIG. 10 is executed in the illumination control apparatus 10.

First, the weighting processor 300 acquires a plurality of element spectra stored in the element spectrum storage 123 in step S200.

The reference illumination light spectrum input unit 400 receives input of a reference illumination light spectrum serving as a reference for the illumination control apparatus 10 in step S210.

The designated condition input unit 200 receives input of designated conditions in step S220.

The weighting processor 300 selects at least one element spectrum that satisfies the input designated conditions from the plurality of element spectra and determines a weight for each of the at least one selected element spectrum in step S230.

The composite illumination light spectrum calculator 500 calculates a composite illumination light spectrum that is an illumination light spectrum satisfying the designated conditions on the basis of the plurality of element spectra acquired in step S200, the reference illumination light spectrum received in step S210, and the designated conditions received in step S220 in step S240.

The illumination light generator 600 radiates illumination light to an object through the output unit 700 on the basis of a composite illumination light spectrum calculated by weighting each of the at least one selected element spectrum and adding or subtracting the weighted element spectrum to or from the reference illumination light spectrum in step S250.

The illumination light spectrum measurement unit 810 measures a spectrum of the illumination light radiated in step S250 using a spectral radiance meter or the like in step S260.

The accuracy determination unit 820 compares the composite illumination light spectrum acquired in step S240 with the spectrum of the illumination light measured in step S260 to calculate an error therebetween in step S270.

The accuracy determination unit 820 determines whether the error is equal to or greater than a predetermined reference value in step S280.

When the error is equal to or greater than the predetermined reference value (YES in step S280), the accuracy determination unit 820 determines that the accuracy of the output illumination light is not sufficient and transmits the error to the illumination light generator 600 in step S290. In step S300, when the error is received from the accuracy determination unit 820, the illumination light generator 600 corrects the illumination light on the basis of the error and the composite illumination light spectrum, radiates the illumination light through the output unit 700, returns to step S260 and repeats the processes of steps S260 to S280.

On the other hand, when the error is less than the predetermined reference value (NO in step S290), the accuracy determination unit 820 updates the reference illumination light spectrum stored in the reference illumination light spectrum input unit 400 to the measurement result of the spectrum of the illumination light radiated to the object in step S310 and proceeds to step S320.

The illumination control apparatus 10 determines whether to end processing in step S320.

When processing does not end (NO in step S320), the routine returns to step S220 and repeats steps S220 to S310. When processing ends (YES in step S320), the processing ends.

As described above, according to the illumination control apparatus according to an embodiment of the present invention, it is possible to emphasize the chroma of a specific color with respect to an object without affecting the color of illumination light by generating illumination light to be radiated to the object in such a manner that an element spectrum in accordance with designated conditions for chroma adjustment from among a plurality of element spectra that are spectra for being added or subtracted to or from a reference illumination light spectrum that is an illumination spectrum serving as a reference and for performing chroma emphasis of the specific color without affecting the color of the illumination light is added or subtracted.

In addition, it is possible to obtain a composite illumination light spectrum through simple calculation because each of the plurality of element spectra is weighted on the basis of designated conditions. Further, it is possible to reproduce fine adjustment and continuous change of the chroma of a color using a weight.

Meanwhile, the present invention is not limited to the above-described embodiment and may be modified and applied in various manners without departing from the scope of the invention.

Although the numbers of spectral reflection factors, designated conditions and element spectra for representing plural numbers are respectively indicated by L, M and P in the above-described embodiment, all of the numbers may be identical.

Furthermore, when the accuracy determination unit 820 updates the reference illumination light spectrum, the element spectrum generator 100 may be configured to regenerate element spectra on the basis of the updated reference illumination light spectrum.

In addition, designated conditions may include characteristics of illumination used in the illumination light generator 600 (the spectrum, colorimetric value, brightness, input/output characteristics, and the like of an LED light source of each color when the illumination light generator 600 is composed of LED light sources of multiple colors) in addition to the aforementioned conditions with respect to colors. In this case, it is possible to reduce the amount of calculations and calculation time because combinations of LED light sources are limited.

Moreover, an example in which the element spectrum calculator 120 calculates an element spectrum that satisfies a condition that "appearance of white" does not change under the reference illumination light spectrum has been described. However, the element spectrum calculator 120 may calculate an element spectrum on the basis of a background part (e.g., an uncolored part (paper serving as a foundation) or a region in a background color in a picture) and a part in which appearance color is not desired to change (e.g., a main color region of a subject or a normal region at the time of determination of normality and abnormality).

Furthermore, although an embodiment in which a program is installed in advance has been described in the present specification, the program may be provided by being stored in a computer-readable storage medium.

REFERENCE SIGNS LIST

10 Illumination control apparatus
100 Element spectrum generator
110 Spectral reflection factor acquisition unit
111 Imaging unit
112 Spectral reflection factor calculator
113 Spectral reflection factor storage
120 Element spectrum calculator
121 Illumination light spectrum calculator
122 Illumination light spectrum analyzer
123 Element spectrum storage
130 Characteristic information acquisition unit
140 Reference illumination light spectrum acquisition unit
150 Designated condition acquisition unit
200 Designated condition input unit
300 Weighting processor 300
400 Reference illumination light spectrum input unit
500 Composite illumination light spectrum calculator
600 Illumination light generator
700 Output unit
800 Feedback processor
810 Illumination light spectrum measurement unit
820 Accuracy determination unit

The invention claimed is:

1. A computer-implemented method for generating an illumination light for radiating onto an object, the method comprising:
   receiving a predefined condition for chroma adjustment;
   receiving a plurality of element spectra, wherein the plurality of element spectra relate to performing chroma emphasis of a color by adjusting a reference illumination light spectrum without affecting an illumination light color;
   adjusting, based on an element spectrum of the plurality of element spectra according to the predefined condition, the reference illumination light spectrum;
   generating, using the adjusted reference illumination light spectrum, the illumination light for radiating to the object; and
   outputting the generated illumination light radiating onto the object.

2. The computer-implemented method of claim 1, the method further comprising:
   receiving a plurality of spectral reflection factors in the object or from a reference color chip;
   receiving the reference illumination light spectrum;
   receiving a plurality of predefined conditions; and
   determining the element spectrum based at least on:
      the received reference illumination light spectrum,
      the received plurality of spectral reflection factors corresponding to the one or more predefined conditions, and
      the received plurality of predefined conditions.

3. The computer-implemented method of claim 2, the method further comprising:
   for each of the plurality of predetermined conditions:
      determining calculated illumination light spectra based at least on:
         the predetermined condition,
         the reference illumination light spectrum, and
         the spectral reflection factors according to the predefined condition, wherein the calculated illumination light spectra are adjustable based on chroma of a specific color; and
      generating the element spectrum based at least on:
         the calculated illumination light spectra satisfying the predetermined condition, and
         the reference illumination light spectrum.

4. The computer-implemented method of claim 3, the method further comprising:
   determining a composite illumination light spectrum based at least on:
      the generated plurality of element spectra,
      the received reference illumination light spectrum, and
      the received predetermined condition;
   receiving an illumination light spectrum measured at the object receiving the illumination light;
   determining an error between the composite illumination light spectrum and the received illumination light spectrum; and
   updating, based on the determined error, a spectrum of the generated illumination light.

5. The computer-implemented method of claim 4, the method further comprising:
   when the determined error is less than a predetermined threshold value, updating, based on the received illumination spectrum measurement, the reference illumination light spectrum.

6. The computer-implemented method of claim 5, wherein the received predetermined condition relates to emphasizing one color of a set of colors without changing colors of illumination light, the set of colors including white, blue, green, and red.

7. The computer-implemented method of claim 5, wherein the plurality of element spectra include:
   a first element spectrum emphasizing only blue,
   a second element spectrum emphasizing only green, and
   a third element spectrum emphasizing only red.

8. A system for generating an illumination light for radiating onto an object, the system comprises:
   a processor; and
   a memory storing computer-executable instructions that when executed by the processor cause the system to:
      receive a predefined condition for chroma adjustment;
      receive a plurality of element spectra, wherein the plurality of element spectra relate to performing chroma emphasis of a color by adjusting a reference illumination light spectrum without affecting an illumination light color;
      adjust, based on an element spectrum of the plurality of element spectra according to the predefined condition, the reference illumination light spectrum;
      generate, using the adjusted reference illumination light spectrum, the illumination light for radiating to the object; and
      output the generated illumination light radiating onto the object.

9. The system of claim 8, the computer-executable instructions when executed further causing the system to:
   receive a plurality of spectral reflection factors in the object or from a reference color chip;
   receive the reference illumination light spectrum;
   receive a plurality of predefined conditions; and
   determine the element spectrum based at least on:
      the received reference illumination light spectrum,
      the received plurality of spectral reflection factors corresponding to the one or more predefined conditions, and
      the received plurality of predefined conditions.

10. The system of claim 9, the computer-executable instructions when executed further causing the system to:
    for each of the plurality of predetermined conditions:
       determine calculated illumination light spectra based at least on:
          the predetermined condition,
          the reference illumination light spectrum, and
          the spectral reflection factors according to the predefined condition,
       wherein the calculated illumination light spectra are adjustable based on chroma of a specific color; and
       generate the element spectrum based at least on:
          the calculated illumination light spectra satisfying the predetermined condition, and
          the reference illumination light spectrum.

11. The system of claim 10, the computer-executable instructions when executed further causing the system to:
    determine a composite illumination light spectrum based at least on:
       the generated plurality of element spectra,
       the received reference illumination light spectrum, and
       the received predetermined condition;
    receive an illumination light spectrum measured at the object receiving the illumination light;
    determine an error between the composite illumination light spectrum and the received illumination light spectrum; and update, based on the determined error, a spectrum of the generated illumination light.

12. The system of claim 11, the computer-executable instructions when executed further causing the system to:
when the determined error is less than a predetermined threshold value, update, based on the received illumination spectrum measurement, the reference illumination light spectrum.

13. The system of claim 12, wherein the received predetermined condition relates to emphasizing one color of a set of colors without changing colors of illumination light, the set of colors including white, blue, green, and red.

14. The system of claim 13, wherein the plurality of element spectra include:
a first element spectrum emphasizing only blue,
a second element spectrum emphasizing only green, and
a third element spectrum emphasizing only red.

15. A computer-readable non-transitory recording medium storing computer-executable instructions that when executed by a processor cause a computer system to:
receive a predefined condition for chroma adjustment;
receive a plurality of element spectra, wherein the plurality of element spectra relate to performing chroma emphasis of a color by adjusting a reference illumination light spectrum without affecting an illumination light color;
adjust, based on an element spectrum of the plurality of element spectra according to the predefined condition, the reference illumination light spectrum;
generate, using the adjusted reference illumination light spectrum, the illumination light for radiating to the object; and
output the generated illumination light radiating onto the object.

16. The computer-readable non-transitory recording medium of claim 15, the computer-executable instructions when executed further causing the system to:
receive a plurality of spectral reflection factors in the object or from a reference color chip;
receive the reference illumination light spectrum;
receive a plurality of predefined conditions; and
determine the element spectrum based at least on:
the received reference illumination light spectrum,
the received plurality of spectral reflection factors corresponding to the one or more predefined conditions, and
the received plurality of predefined conditions.

17. The computer-readable non-transitory recording medium of claim 16, the computer-executable instructions when executed further causing the system to:
for each of the plurality of predetermined conditions:
determine calculated illumination light spectra based at least on:
the predetermined condition,
the reference illumination light spectrum, and
the spectral reflection factors according to the predefined condition,
wherein the calculated illumination light spectra are adjustable based on chroma of a specific color; and
generate the element spectrum based at least on:
the calculated illumination light spectra satisfying the predetermined condition, and
the reference illumination light spectrum.

18. The computer-readable non-transitory recording medium of claim 17, the computer-executable instructions when executed further causing the system to:
determine a composite illumination light spectrum based at least on:
the generated plurality of element spectra,
the received reference illumination light spectrum, and
the received predetermined condition;
receive an illumination light spectrum measured at the object receiving the illumination light;
determine an error between the composite illumination light spectrum and the received illumination light spectrum; and
update, based on the determined error, a spectrum of the generated illumination light.

19. The computer-readable non-transitory recording medium of claim 18, wherein the received predetermined condition relates to emphasizing one color of a set of colors without changing colors of illumination light, the set of colors including white, blue, green, and red.

20. The computer-readable non-transitory recording medium of claim 19, wherein the plurality of element spectra include:
a first element spectrum emphasizing only blue,
a second element spectrum emphasizing only green, and
a third element spectrum emphasizing only red.

* * * * *